United States Patent
Winters et al.

[11] 3,894,425
[45] July 15, 1975

[54] TWO-COORDINATE LOCATING DEVICE FOR A ULTRASONIC SEARCH PROBE

[75] Inventors: Donald C. Winters, Rensselaer; James J. Miller, Waterford, both of N.Y.

[73] Assignee: The United States of America as represented by the Secretary of the Army, Washington, D.C.

[22] Filed: Feb. 27, 1974

[21] Appl. No.: 446,556

[52] U.S. Cl. .............................................. 73/67.8 S
[51] Int. Cl.² .......................................... G01N 29/04
[58] Field of Search ......... 73/67.8 S, 67.9, 71.5 US; 324/37; 250/360

[56] References Cited
UNITED STATES PATENTS
3,349,609   10/1967   Ryzhov-Nikonov et al. ......... 73/67.9
3,621,708   11/1971   Regas ............................... 73/67.8 S

*Primary Examiner*—Richard C. Queisser
*Assistant Examiner*—John P. Beauchamp
*Attorney, Agent, or Firm*—Robert P. Gibson; Nathan Edelberg

[57] ABSTRACT

The continuous location of the polar coordinates of a search probe of the type utilized in the ultrasonic detection of cracks or other flaws in thick-walled tubes is provided by a device magnetically attached to the exterior of the tube at one end thereof in predetermined relation to a given point on the surface thereof. As the tube surface is randomly scanned by the probe, the central shaft of a first incremental encoder therein is rotated by the unwinding of a flexible cable from a rotatable reel to generate electrical counting pulses indicative of the length of cable passing beyond a point coincident with the fixed reference point thereby providing a reading of the distance coordinate of the probe. At the same time, the central shaft of a second identical encoder mounted at right angles to the first encoder shaft and in alignment with the fixed reference point is rotated to generate counting pulses indicative of the angle through which the probe has moved relative to the vertical thereby providing a reading of the angular coordinate of the probe. These pulses are fed to a recorder which provides a constantly changing visual display of the dimensions of the polar coordinates of the probe and a permanent record thereof whenever the probe traverses a crack or other flaw in the tube.

13 Claims, 4 Drawing Figures

PATENTED JUL 15 1975

SHEET 1

3,894,425

3,894,425

TWO-COORDINATE LOCATING DEVICE FOR A ULTRASONIC SEARCH PROBE

BACKGROUND OF THE INVENTION

This invention relates to means for locating the polar coordinates of a point undergoing random movement and is more particularly directed to a locating device for electronically determining the coordinate position of an ultrasonic probe at any given time during the scanning movement thereof over an arcuate or planar surface.

The detection of radial cracks and other flaws in thickwalled cylinders such as gun tubes and the rate of propagation thereof in response to actual or simulated firing has been successfully accomplished by an ultrasonic technique wherein a search probe is randomly scanned over the exterior surface of the tube to produce a signal on a display scope indicative of the depth of the crack. Heretofore, the coordinate location of various points along the crack was determined by utilizing a ring calibrated in degrees to measure the angle through which the probe was moved relative to a fixed reference line on the exterior surface of the cylinder coextensive with the longitudinal axis thereof and then measuring the linear distance between the probe and the top of the cylinder along a line parallel to the fixed reference line. These measurements were then plotted on a graph representative of the exterior periphery of the cylinder to provide a visual display of the extent and shape of the crack. However, whenever a plurality of different crack locations are involved, such manual technique results in a cumbersome and lengthy process wherein the accuracy thereof is directly dependent upon the skill, experience, and judgment of the operator of the probe.

It is therefore an object of this invention to provide a locating device which lends itself to the electronic determination of the polar coordinates of an ultrasonic search probe at any position thereof relative to a fixed reference point.

It is a further object of the present invention to provide a flexible but accurate locating device, as aforesaid, which is particularly effective when the search probe is randomly scanned over a cylindrical surface.

Still another object of this invention is the provision of a locating device, as aforesaid, which will continuously indicate the desired polar coordinates in relation to the fixed reference point from which the search probe is manipulated.

An additional object of this invention is to provide a locating device which will respond to the helical path followed by a search probe during the random scanning movement thereof over a cylindrical surface and provide a continuous determination of the polar coordinates of the position of the probe for visual display on a digital recorder.

It has been found that the foregoing objects can be readily accomplished by a locating device removably secured to one end of the cylinder in electrical connection with an ultrasonic search probe arranged to detect any flaws or cracks in the cylinder. Such device includes a first incremental encoder provided with an axial shaft disposed in a plane tangent to the exterior surface of the cylinder at a given point thereon and a second incremental encoder provided with an axial shaft disposed at right angles to the shaft of the first encoder in radial alignment with the given point on the exterior of the cylinder. Both encoders are in electrical connection with corresponding counters in a recording unit separate from the cylinder. The rotatable shaft of the first encoder is axially coupled to a rotatable pulley located so that the exterior periphery thereof is in rotational engagement with a flexible cable extending from a take-up reel subject to the constant torque of a negator spring. The cable passes over and beyond the pulley at right angles to the shaft of the first encoder through an exit opening in the locating device spaced outwardly of the given point on the exterior of the cylinder and then continues into attachment with the search probe. The rotatable shaft in the second encoder is axially coupled to one end of a guide arm which extends downwardly therefrom and inwardly toward the cylinder to terminate at the other end thereof in an opening disposed in axial alignment with the fixed exit opening in the location device through which the cable passes into attachment with the search probe.

Thus, when the search probe is pulled along the surface of the cylinder under inspection, the flexible cable is correspondingly unwound from the take-up reel to impart rotation to the pulley in engagement therewith and thereby function the encoder to produce incremental pulses at the rate of one pulse per 0.01 inches of cable travel. Although the compound movement of the search probe describes a helical path along the exterior of the cylinder, the exit opening in the bottom of the locating device is positioned to maintain the flexible cable parallel to the direction of the unwinding movement thereof. As a result, the vertical component of the probe movement produces a corresponding unwinding of the flexible cable and consequent pulsing of the first encoder. Similarly, since the connection between the guide arm and the second encoder lies in the same plane as the opening in the locating device for the exit of the cable, the angular coordinate of the compound movement of the search probe will cause the free end of the guide arm to swing through an equivalent arc and rotate the shaft of the second encoder to provide incremental pulses at the rate of one pulse per degree of angular travel. The incremental pulses produced by each encoder are digitally converted in the recording unit into a continuous visual indication of the coordinate position of the probe at any given time. In addition, the pulses are arranged to be permanently recorded in direct response to the ultrasonic detection of any flaw or crack in the cylinder under inspection.

DESCRIPTION OF A PREFERRED EMBODIMENT

A recently developed ultrasonic technique for the detection of fatigue cracks and other flaws in large diameter tubes permits the depth at any point in each crack to be read directly from the display produced on an oscilloscope by a transducer in a search probe. In addition, the exact location of the crack or of any point thereon can be determined by passing the probe over the crack in a direction transverse to its length. Thus, if the entire exterior surface of a tube is scanned by the probe, a pictorial representation of the shape, extent, and location of each crack or similar flaw therein can be readily created. By preparing and recording such information in "map" form at predetermined intervals during the dynamic stressing of the tube, the growth of each crack can be followed to the point of complete penetration of the wall of the tube.

Heretofore, these displays or maps of crack propagation have been made by manually marking the tube surface with a crayon indicating the depth of the various cracks therein at selected points thereon. Then, using a measuring stick and a calibrated ring of slightly greater diameter than the tube, the rectangular coordinates of each selected point on a crack can be determined in inches measured along the longitudinal axis of the tube and in degrees in the plane normal to such longitudinal axis. In order to eliminate the obvious drawbacks resulting from a measurement wherein the accuracy thereof is dependent on the skill, judgment, and experience of the operator, there has been developed a semi-automatic measuring and recording system which provides a simultaneous electronic reading of the polar coordinates of the continuously changing angular path followed by an ultrasonic search probe during the random scanning movement thereof over the exterior surface of the tube undergoing inspection for flaws and cracks.

Figure 1:
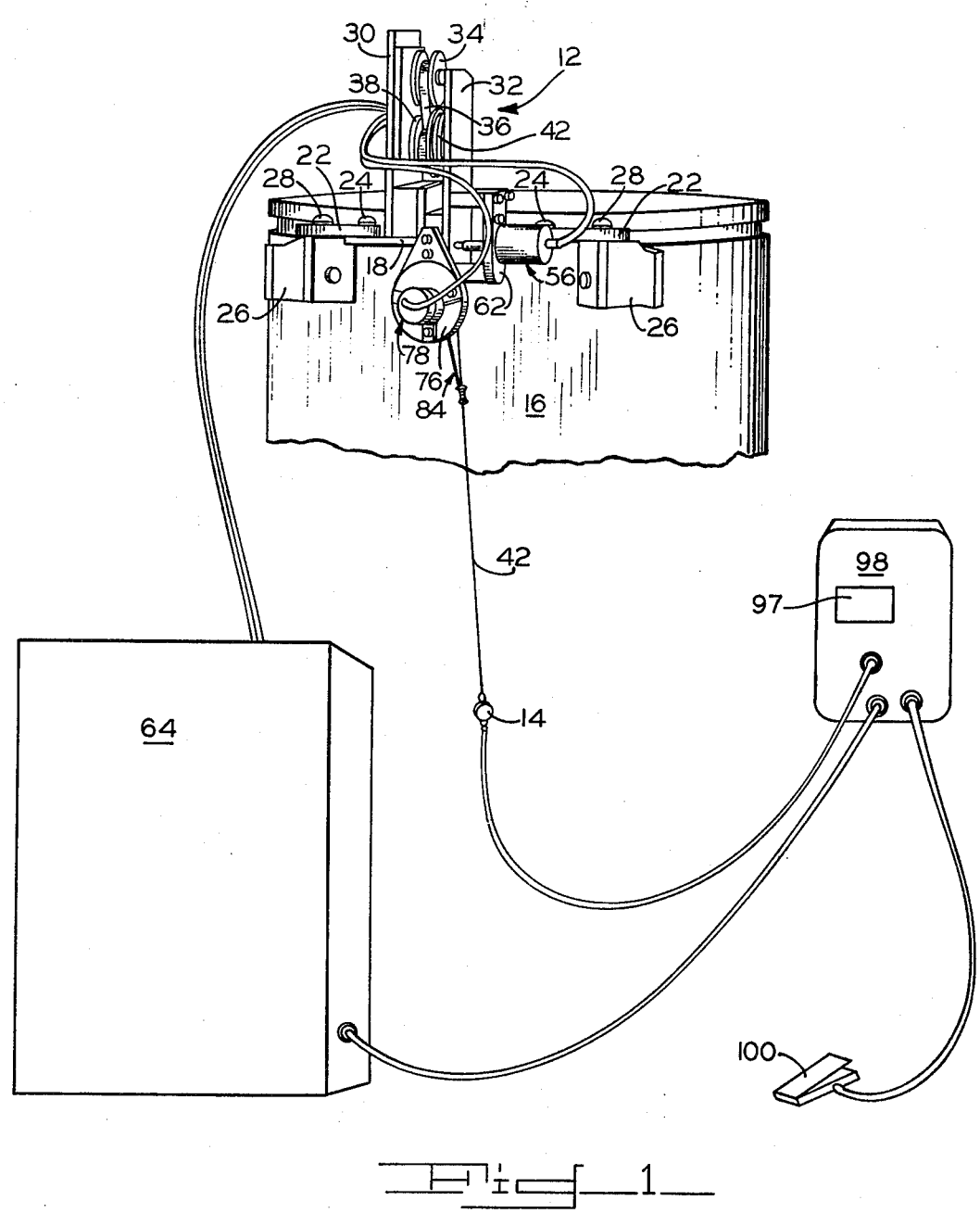
FIG. 1 is an elevational view in perspective showing the locating device of the present invention releasably mounted on the upper end of a large diameter cylinder and in electrical connection with an ultrasonic flaw detector and a recording unit.
Figure 2:
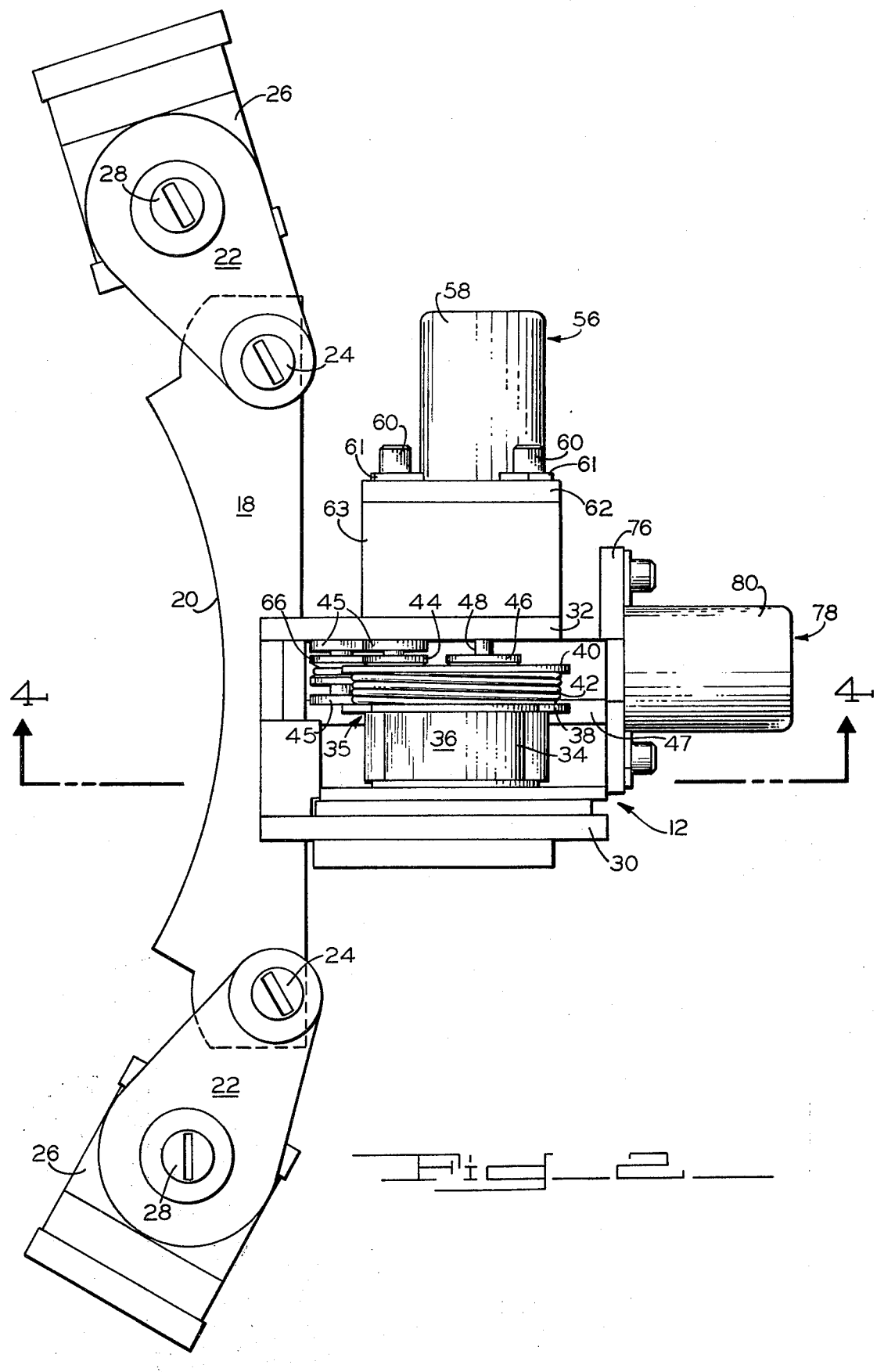
FIG. 2 is an enlarged top view of the locating device.

The present invention is primarily directed to a locating device 12 for determining the coordinate location of a search probe 14 and, as best shown in FIG. 1, is preferably removably mounted on one end of the tube 16 to be inspected. This is accomplished by providing device 12 with a cross-bar 18 having an arcuate surface 20 on one side thereof, as shown in FIG. 2, of slightly larger curvature than the exterior periphery of the largest diameter tube to be scanned for the detection of flaws and cracks. Pivoted to the opposite extremities of cross-bar 18 are adjusting elements 22 which can be set in a desired angular position by suitable locking screws 24. Similarly pivoted to the outer ends of elements 22 are magnetic blocks 26 arranged to adhere to the exterior periphery of tube 16 and provided with locking screws 28 for maintaining the selected orientation thereof relative to adjusting elements 22.

Figure 3:
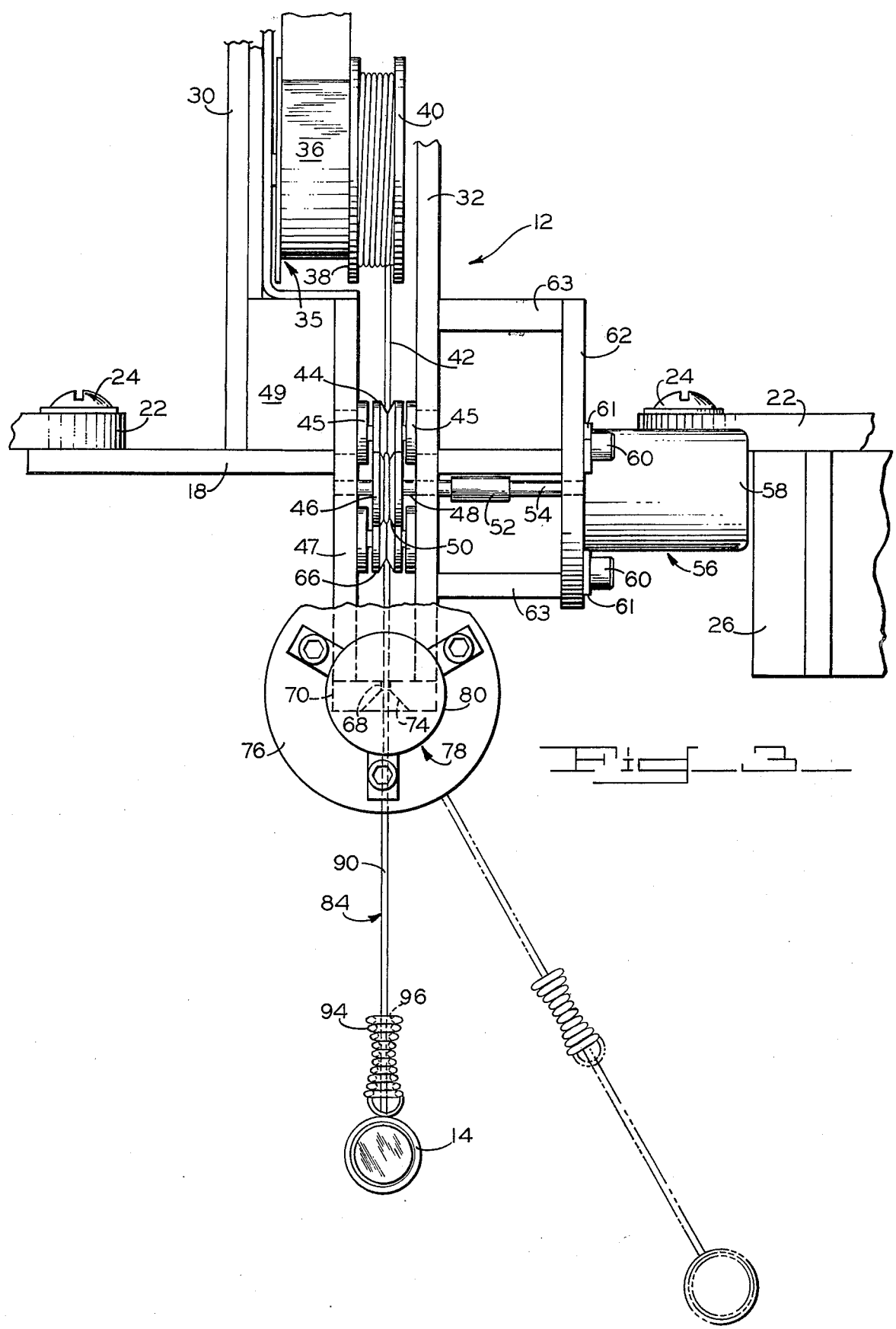
FIG. 3 is a front elevational view of the locating device with the bracket on which the angle measuring encoder is mounted being partially broken away to show the pulley arrangement for operating the distance measuring encoder and also showing in phantom outline the guide arm swung to an angular position relative to the pre-measuring position thereof.
Figure 4:
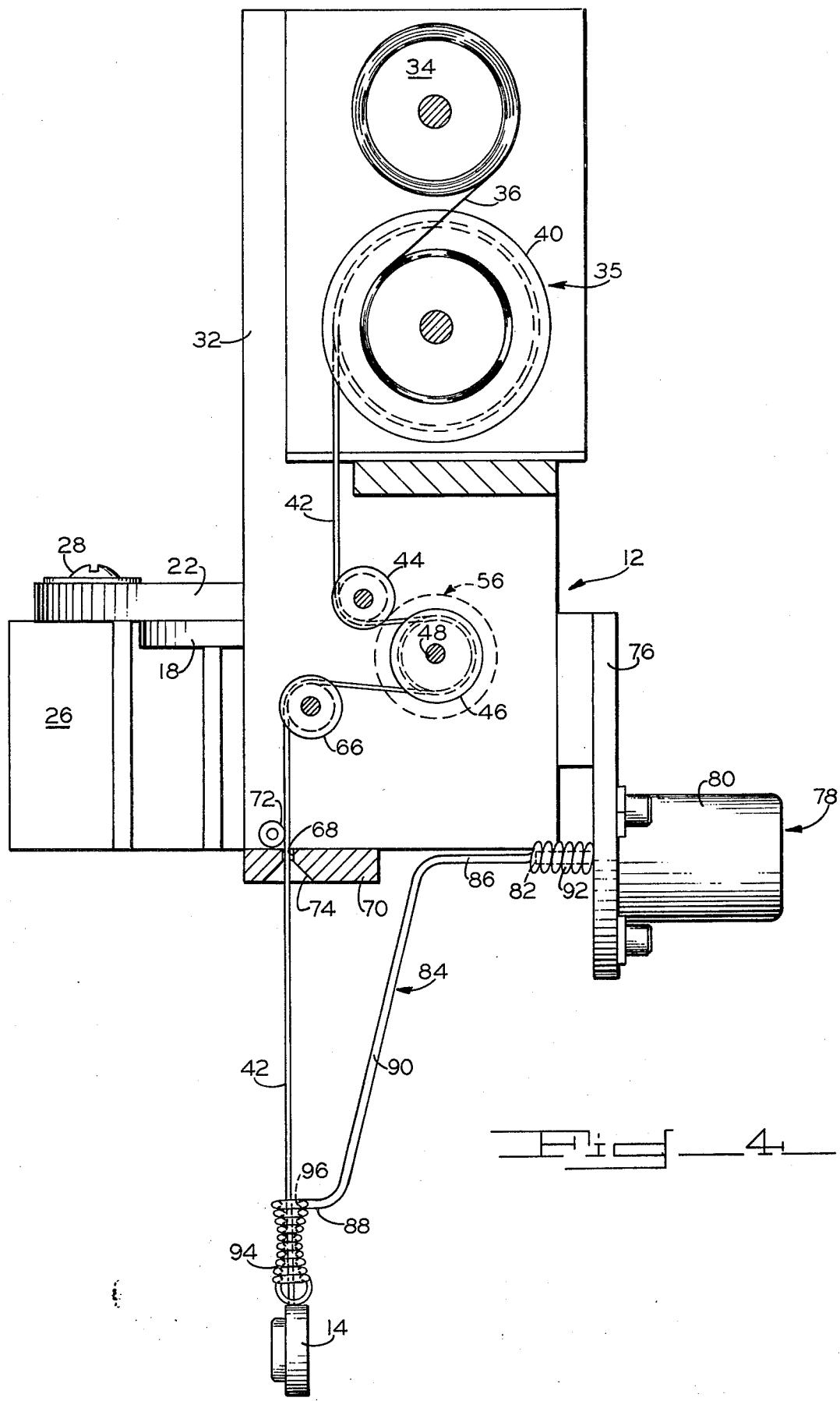
FIG. 4 is a section taken along line 4—4 in FIG. 2 showing the details of the take-up reel utilized to return the search probe to the pre-measuring position thereof and the details of the pulley system utilized to rotate the shaft of the linear measuring encoder.

Extending upwardly and outwardly from the side of cross-bar 18 opposite arcuate surface 20 are spaced plates 30 and 32 with a spool 34 rotatably mounted therebetween at the upper end thereof and a take-up reel 35 similarly mounted immediately therebelow. A constant torque negator spring 36 in the form of a steel tape is wound on spool 34 and extends therefrom for attachment to a similar spoon portion 38 of take-up reel 35. Adjacent spool portion 38 in side-by-side relation thereto is another spool portion 40 to which one end of a flexible cable 42, preferably in the form of a steel wire, is fixedly attached. Cable 42 extends downwardly from spool portion 40 to pass around a pulley 44 rotatably mounted between spacers 45 fixed to the inner sides of plates 30 and 32. The location as well as the diameter of pulley 44 is selected to maintain the portion of cable 42 depending from take-up reel 35 in parallel relation to the vertical axis of tube 16. A second pulley 46 of larger diameter is secured to a shaft 48 rotatably mounted between plate 32 and an intermediate plate 47 fixed to plate 30 by a spacer block 49, as shown in FIG. 3. Shaft 48 is located to position pulley 46 below pulley 44 in vertical alignment with both spool 34 and take-up reel 35, as best shown in FIG. 4. Pulley 46 is appropriately sheaved, as indicated at 50 in FIG. 3, so that the passage of cable 42 therearound will provide sufficient frictional engagement therebetween to impart corresponding rotation to shaft 48. In the event a more positive engagement between cable 42 and pulley 46 is desired, cable 42 may be formed as a narrow tape with sprocket holes or side notches therein fitting over corresponding teeth on pulley 46 in driving engagement therewith.

One end of shaft 48 extends outwardly from plate 32 into fixed engagement with a coupler 52 similarly fixed to the free end of a shaft 54 extending centrally from an incremental optical encoder 56 such as, for example, the Model 8610 manufactured by Gurley Co. of Troy, N.Y. This type of encoder is provided with a cylindrical body 58 arranged to be held stationary relative to shaft 54, here accomplished by screws 60 passing through each of a plurality of projecting tabs 61 at one end of body 58 into threaded engagement with an end plate 62 spaced from plate 32 by separators 63. A suitable disc (not shown) is arranged to rotate within body 58 together with shaft 54 so as to produce quadrature pulses from a pair of phototransistor circuits in electrical connection with a counter (not shown) incorporated in a recording unit 64 physically separate from the tube 16 undergoing inspection. Inasmuch as the counter is reversible, rotation of shaft 54 in one direction provides a positive count while rotation in the opposite direction provides a negative count reducing the total shown by the positive count. Furthermore, the counters can be reset to zero at any time regardless of the rotated position of shaft 54 so that subseuent rotation thereof will be measured in either direction from such zero position.

Upon leaving pulley 46, cable 42 passes over a third rotatable pulley 66 similar in size and mounting arrangement to pulley 44 and located below pulley 46 at a location closer to cross-bar surface 20 than pulley 44. From pulley 66, cable 42 passes downwardly to exit from an opening 68 in a block 70 suitably affixed to the bottom edges of plates 47 and 32. Opening 68 is spaced in alignment with the periphery of pulley 66 to position the portion of cable 42 depending therefrom in parallel relation with the portion extending between spool portion 40 of take-up reel 35 and pulley 44. In addition, a guide roller 72 is mounted between plates 47 and 32 immediately above block 70 in position to direct cable 42 into opening 68 without contact with the entry edges thereof. The bottom of opening 68 is countersunk, as indicated at 74, to permit the remainder of cable 42 to exit freely therefrom during the scanning movement of probe 14 to which the end of cable 42 is suitably attached. The small diameter end of countersink 74 is disposed in coaxial alignment with shaft 82 of encoder 78 and serves as the fixed reference point from which the polar coordinates of probe 14 are measured. Although the location of cracks and other flaws in tube 16 should be measured from a fixed reference point on the exterior surface thereof for optimum accuracy, such reference point is actually spaced outwardly of the surface of tube 16 to prevent cable 42 from rubbing thereagainst as probe 14 is scanned thereover. The difference between the given and actual locations of the reference point does not significantly affect the accuracy of the measurements along the coordinates of the location of probe 14.

A bracket 76 is fixedly secured to the sides of plates 47 and 32 and depends therefrom to serve as a mount for an incremental encoder 78 provided with a cylindrical body 80 and a centrally projecting rotatable shaft 82. Such encoder 78 is similar in structure and mounting to the previously described encoder 56 and is vertically located on bracket 76 to position shaft 72 immediately below plate 32 and in axial alignment with the small diameter end of countersink 74. A guide arm 84, preferably fabricated from a steel rod, is formed with parallel end portions 86 and 88 joined by an angular portion 90 therebetween. End portion 86 terminates in a plurality of coils 92 arranged to tightly engage the end of shaft 82 projecting from body 80 while end portion 88 terminates in a plurality of vertical coils 94 arranged to form an opening 96, preferably of hour-glass configuration, for passage of cable 42 to connection with search probe 14. Since the torque of negator spring 36 exerts a constant winding bias on take-up reel 35, probe 14 is initially pulled into contact with the lowermost coil 94 of end portion 88 of guide arm 84 to position cable 42 in a taut pre-measuring position.

As probe 14 is scanned over the exterior surface of tube 16, any flaw or crack therein will produce a corresponding change in the display signal of an oscilloscope 97 in a flaw detection unit 98 in direct correspondence with the depth of the portion of the crack being traversed by probe 14. Unit 98 is in electrical connection with probe 14 and recording unit 64 but is physically separate from the latter as well as from tube 16. When a crack is detected, operation of a foot switch 100 functions recorder unit 64 to provide a permanent record of the coordinates of probe 14 as well as the depth of the crack at that point. Movement of probe 14 away from end portion 88 of guide arm 84 causes cable 42 to unwind from spool portion 40 and impart rotation thereto which, in turn, simultaneously unwinds negator spring 36 from spool 34 to exert a return bias on take-up reel 35. As cable 42 is unwound, the portion thereof passing over pulley 46 imparts corresponding rotation thereto which, in turn, rotates shaft 54 of encoder 56 to produce 250 separate pulses for each revolution of the counting disc therein. The configuration and arrangement of pulleys 44, 46, and 66 is such that cable 42 travels 0.01 inch between each recorded pulse. Due to friction losses, the torque of spring 36 is greater when cable 42 is being pulled away from take-up reel 35 than during the return thereof thereby producing more stretch in cable 42 during the unwinding thereof from spool portion 40. It has been found that the accumulated error at the last reading thereof can amount to as much as 0.15 inch where probe 14 is pulled in the direction in which encoders 56 and 78 will be subject to a positive count throughout the entire scanning operation. However, since probe 14 is generally pulled in a random manner, the movement of cable 42 will include some winding thereof on spool portion 40 as well as unwinding therefrom and the swinging of guide arm 84 will include some clockwise as well as counterclockwise movement. Accordingly, the summation of both positive and negative encoder function will minimize the accumulated error.

As probe 14 is pulled away from end 88 of guide arm 84, any movement thereof in the direction transverse to the vertical axis of tube 16 will impart swinging movement to guide arm 84 in a plane parallel to the plane tangent to the exterior surface of tube 16 at the theoretical given reference point thereon. The resulting rotation of shaft 82 of encoder 78 rotates the counting disc therein (not shown) to produce one pulse for each degree of rotation. Since locating device 12 is generally mounted on the top of tube 16, the angular travel of probe 14 is limited to 180° in either direction from a vertical line passing through fixed opening 68. In addition, while guide arm 84 is constructed to resist any bending thereof in a direction transverse to the longitudinal axes of end portions 86 and 88, some flexibility is provided at the junction between end portion 86 and angular portion 90 in the direction toward the exterior surface of tube 16. As a result, when search probe 14 is pulled to those positions where the angular coordinate is substantially greater than the linear coordinate, guide arm 84 will be flexed to the extent necessary to permit the portion of cable 42 between opening 68 and coils 94 to conform to the curvature of the surface of tube 16 and thereby minimize the inaccuracy which would otherwise be introduced if end portion 86 were rigidly joined to angular portion 90 so that end 88 would continue in a straight line away from the surface of tube 16 as the angular coordinate of the probe movement increases relative to the linear coordinate.

Thus, there is here provided a simple but efficient combination of two incremental encoders which will provide a continuous measurement of the polar coordinates of a search probe during the random scanning movement thereof over a cylindrical surface and at the same time present such information in temporary visual form as well as in permanent recorded form. Although both coordinates are determined in relation to a fixed reference point, the encoders can be readily reset to a zero reading whenever it is desired to change the reference point to a new location.

The foregong disclosure and description of the invention is illustrative only. Various changes may be made within the scope of the appended claims without departing from the spirit of the invention.

We claim:

1. In a system for scanning an arcuate surface with an ultrasonic search probe to detect the existence of cracks and other flaws therein, means for continuously locating the polar coordinates of the probe relative to an actual fixed reference point radially spaced outwardly of a theoretical given point on the arcuate surface, comprising, a reel releasably mounted to the arcuate surface in spaced relation to the fixed reference point for rotation about an axis parallel to the plane tangent to the arcuate surface at the given point thereon, a flexible cable having one end wound on said reel and the other end thereof connected to the probe, spring means responsive to the rotation of said reel for imparting a constant torque thereto in opposition to the unwinding of said cable therefrom, a first incremental encoder rotatably responsive to the winding and unwinding of said cable from said reel for generating electrical counting pulses in direct relation to the length of said cable unwound from said reel during the scanning movement of the search probe, a second incremental encoder mounted at right angles to said first encoder and rotatably responsive to the angular movement of the probe for generating electrical counting pulses in direct relation to the extent of the angle between the probe and a line through the fixed reference point normal to the axis of rotation of said reel, and means for visually presenting the output of each of said first and second encoders throughout the scanning movement of the probe.

2. The locating means defined in claim 1 including switch means for permanently recording the visual presentation of the output of said encoders during the traverse of the probe over a crack in the arcuate surface.

3. The locating means defined in claim 1 wherein said spring means comprises, a first rotatable spool forming a portion of said reel, a second rotatable spool spaced from said first spool in parallel relation thereto, and a negator spring partially wound around each of said first and second spools and biased to resist the unwinding thereof from said second spool.

4. The locating means defined in claim 3 including a guide arm disposed between the arcuate surface and said second incremental encoder, one end of said arm coupled to said second encoder and the other end of said arm having an opening therethrough for passage of said cable into connection with the search probe whereby the angular scanning movement thereof over the arcuate surface actuates said guide arm to rotate said second encoder for generating the electrical counting pulses utilized to indicate the extent of the angular coordinate of the probe.

5. The locating means defined in claim 4 including pulley means rotatably responsive to the winding and unwinding movement of said cable on said reel comprising, a first rotatable pulley spaced from said first spool in position to maintain the portion of said cable therebetween normal to the axis of rotation of said reel, a second rotatable pulley disposed in common alignment with said first and second spools and in frictional engagement with said cable, and a third rotatable pulley spaced from said first and second pulleys in position to maintain the portion of said cable between said third pulley and said opening in said guide arm in parallel relative with the portion of said cable between said first spool and said first pulley.

6. In a system for scanning the exterior surface of a tube with an ultrasonic probe to detect the existence of cracks and other flaws therein, means for continuously locating the polar coordinates of the probe in relation to a fixed reference point on the locating means, comprising, a reel releasably mounted in spaced relation to one end of the tube for rotation about an axis parallel to the plane tangent to the exterior of the tube at a point in radial alignment with the fixed reference point, a flexible cable having one end wound on said reel and the other end thereof connected to the probe, spring means responsive to the rotation of said reel for imparting a constant torque thereto in opposition to the unwinding movement of said cable, a first incremental encoder having a central shaft rotatably responsive to the winding and unwinding of said cable from said reel for generating electrical counting pulses in direct relation to the length of said cable unwound from said reel during the scanning movement of the search probe, a second incremental encoder having a central shaft disposed at right angles to said first encoder shaft in axial alignment with the fixed reference point and rotatably responsive to the angular movement of the probe for generating electrical counting pulses in direct relation to the extent of the angle between the probe and a line through the fixed reference point normal to the axis of rotation of said reel, and means for visually presenting the output of each of said encoders throughout the scanning movement of the probe.

7. The locating means defined in claim 6 including means for releasably mounting said reel to one end of the tube, comprising, a cross-bar terminating in magnetic blocks at each end thereof for clamping engagement with the exterior surface of the tube, means for adjusting the position of said blocks relative to said cross-bar to prevent contact between said cross-bar and the exterior surface of the tube, and a pair of spaced plates projecting from said cross-bar in position to rotatably receive said reel therebetween.

8. The locating means defined in claim 7 wherein said spring means comprises, a spool portion adjacent one end of said reel, a separate spool rotatably mounted between said spaced plates in spaced alignment with said spool portion of said reel, and a negator spring having one end thereof wound around said spool and the other end thereof wound around said spool portion of said reel in the direction in which the bias thereof resists the rotation imparted to said reel by the unwinding of said flexible cable therefrom.

9. The locating means defined in claim 8 including, a plate intermediate said pair of spaced plates, and pulley means between said intermediate plate and one of said spaced plates for supporting said flexible cable, said pulley means comprising, a first rotatable pulley spaced from said reel and disposed to position the portion of said cable therebetween normal to the axis of rotation of said reel, a second pulley spaced from said first pulley and from said reel for rotation about an axis disposed in the plane common to the axes of both said separate spool and said spool portion of said reel, said second pulley being thereby positioned to rotate in response to the frictional engagement of said cable therewith, and a third pulley spaced from said first and second pulleys in offset relation thereto for supporting the portion of said cable extending from said second pulley in parallel relation to the portion between said first pulley and said reel.

10. In a system for scanning the exterior surface of a tube with an ultrasonic probe to detect the existence of cracks and other flaws therein, means for continuously locating the polar coordinates of the probe relative to a fixed reference point radially spaced outwardly of a given point on the exterior surface of the tube, comprising, a reel releasably mounted in spaced relation to one end of the tube for rotation about an axis disposed in parallel relation to the plane tangent to the exterior surface of the tube at the given point thereon, said reel having first and second spool portions in juxtaposed relation, a rotatable spool spaced from said reel in parallel relation thereto, a flexible cable having one end wound on said second spool portion of said reel and the other end thereof extending into connection with the probe, pulley means for supporting said cable for passage through the fixed reference point in a direction normal to the axis of rotation of said reel, a negator spring having one end wound on said spool and the other end thereof wound on said first spool portion of said reel, said spring responsive to the rotation of said reel during the unwinding of said cable therefrom for imparting a constant torque thereto arranged to restore said cable to the unwound position thereof, a first incremental encoder having a central shaft coupled to said pulley means for simultaneous rotation therewith whereby the movement of said cable relative to said reel generates electrical counting pulses in direct relation to the changes in the length of said cable from the fixed reference point to the search probe, a second incremental encoder having a central shaft disposed at right angles to the axis of said shaft of said first encoder in the plane passing through the fixed reference point and rotatably responsive to the angular movement of the search probe for generating electrical counting pulses in direct relation to the extent of the angle between the probe and a line through the fixed reference point normal to the axis of rotation of said reel, and means for visually presenting the output of each of said encoders throughout the scanning movement of the probe.

11. The locating means defined in claim 10 including means for releasably mounting said reel on one end of the tube, comprising, a cross-bar having an arcuate face on one side thereof, an adjusting element pivoted to each end of said cross-bar, a magnetic block pivoted to the outer end of each of said adjusting elements for clamping engagement with the exterior surface of the tube at locations equally distant from the given point thereon, screw means for locking said elements and said magnetic blocks in positions for locating said arcuate face out of contact with the exterior surface of the tube, and a pair of plates fixed to said cross-bar to project beyond the end of the tube in spaced apart relation for rotatably receiving said reel therebetween.

12. The locating means defined in claim 10 including a guide arm disposed between the exterior surface of the tube and said second encoder, said guide arm comprising, a first end fixedly engaged with said central shaft of said second encoder, a second end parallel to said first end and having an opening therethrough for passage of said cable into connection with the search probe, and a linear section connected to said ends whreby said guide arm is pivoted by the angular coordinate of the scanning movement of the probe to rotate said second encoder for generating the electrical counting pulses indicative of the extent of the angular coordinate of the position of the probe.

13. The locating means defined in claim 12 wherein said linear section of said guide arm is connected to said ends for bending movement relative thereto only in the plane common to both said linear section and said ends thereby permitting said cable to conform to the curvature of the tube during movement of the probe therearound.

* * * * *